June 2, 1942.                F. W. SCHARF                2,285,231
                        AUTOMATIC ELECTRIC TOASTER
                         Filed Nov. 12, 1941            5 Sheets-Sheet 5
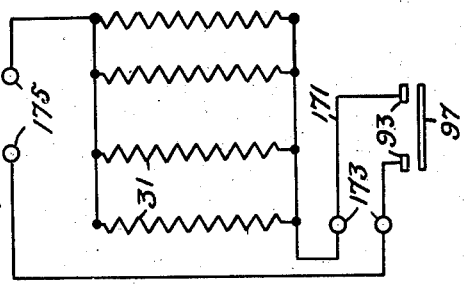
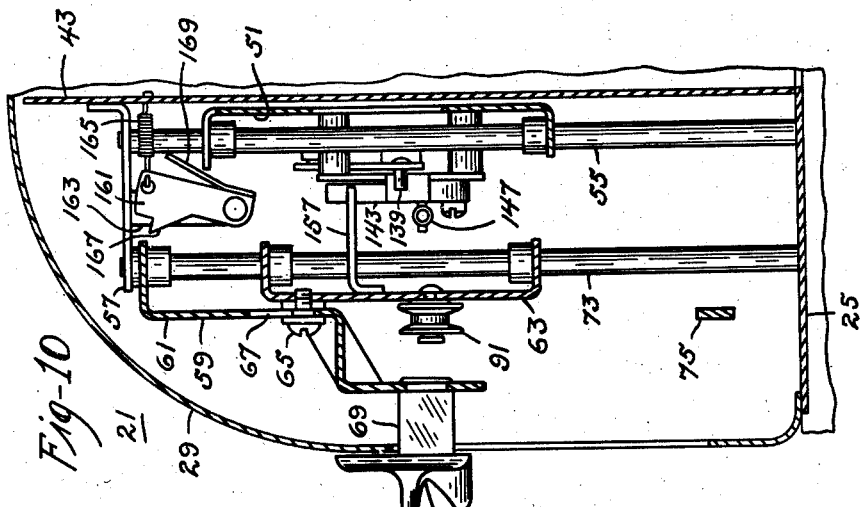
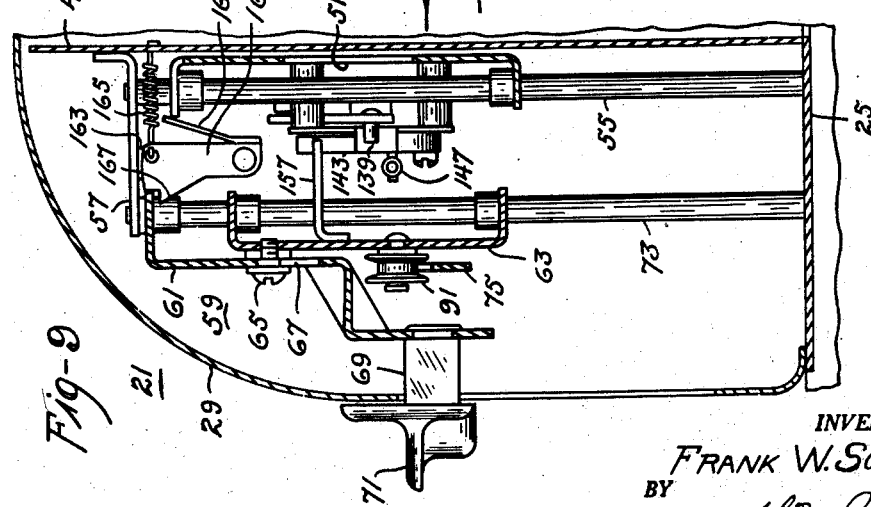
INVENTOR.
FRANK W. SCHARF
BY
*H. M. Biebel*
ATTORNEY Patented June 2, 1942

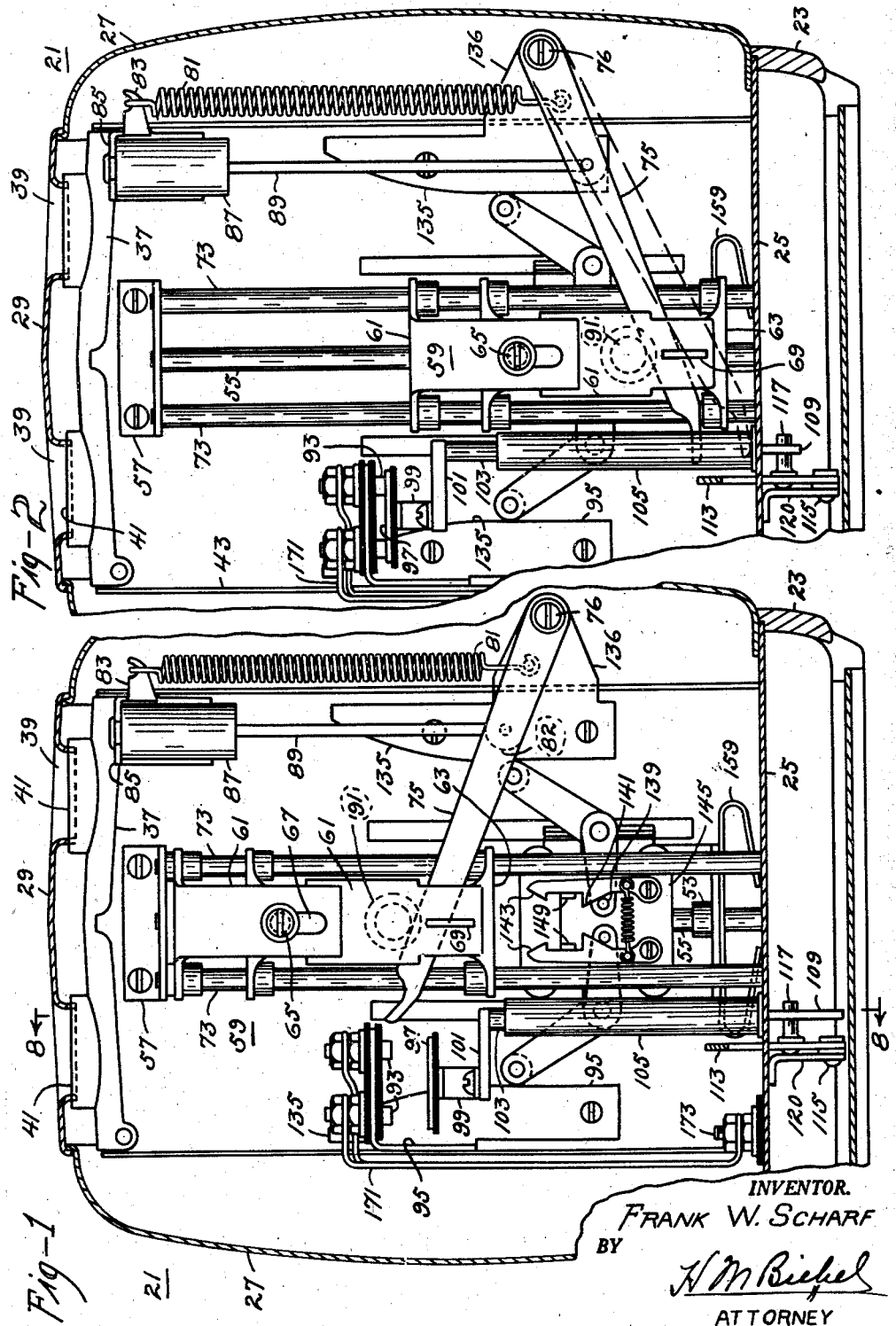

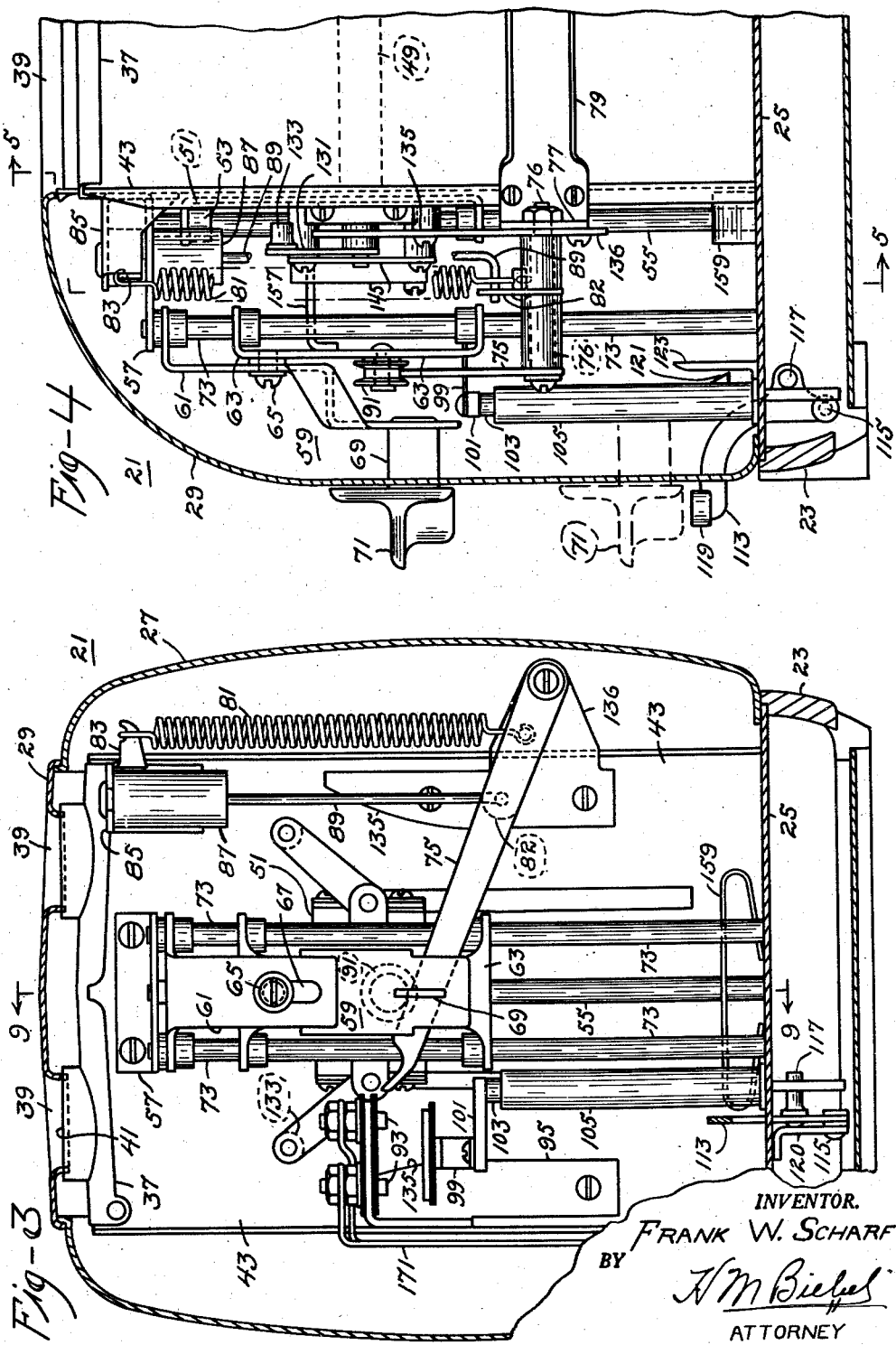

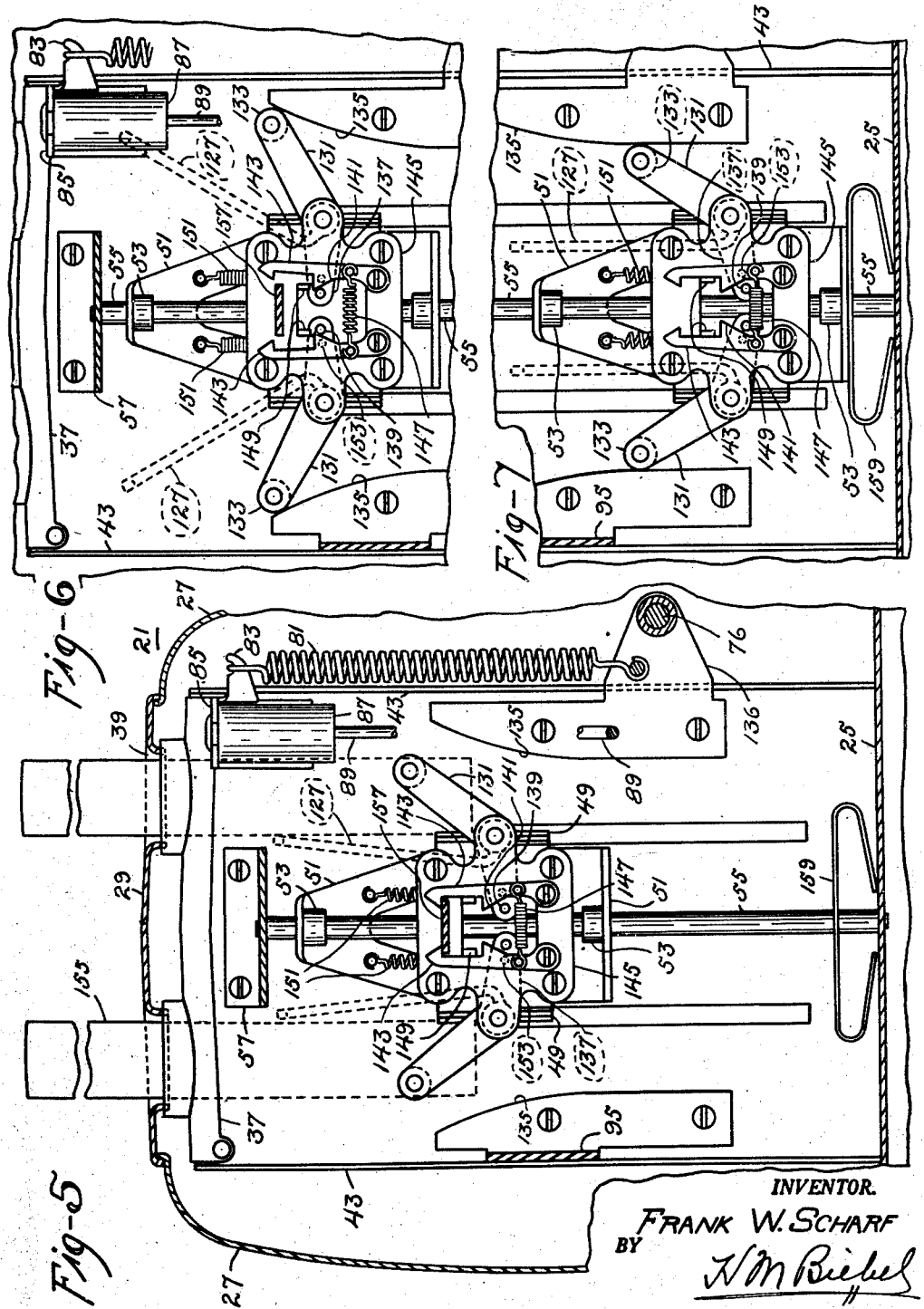

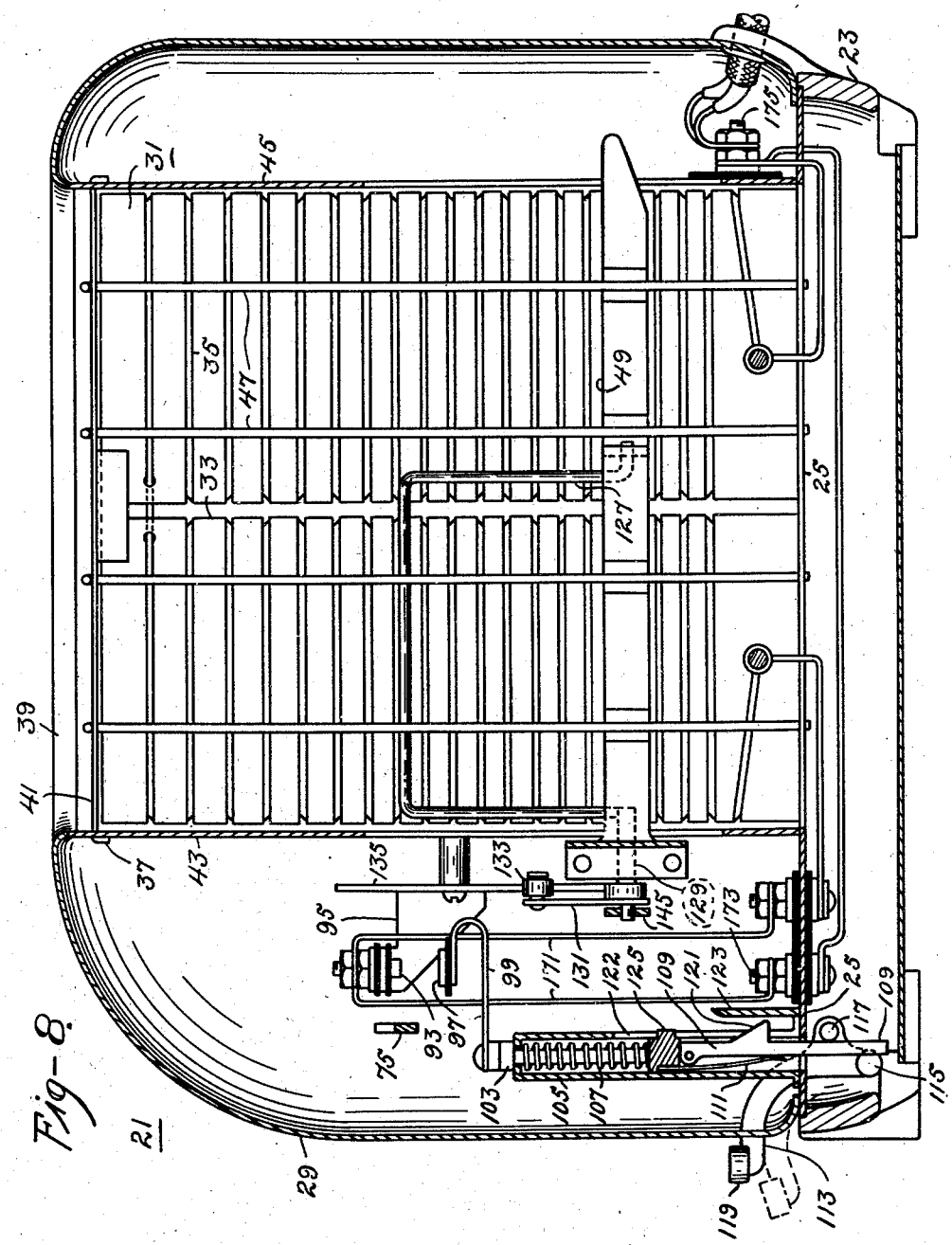

2,285,231

UNITED STATES PATENT OFFICE 2,285,231

AUTOMATIC ELECTRIC TOASTER

Frank W. Scharf, San Gabriel, Calif., assignor to McGraw Electric Company, Elgin, Ill., a corporation of Delaware Application November 12, 1941, Serial No. 418,660

7 Claims. (Cl. 219—19)

My invention relates to automatic electric toasters.

An object of my invention is to provide an automatic electric toaster having a bread carrier normally biased to toasting position, movable into toast-removing position at the end of a toasting operation and operatively held in such position until the slice or slices of toast have been removed from the carrier.

Another object of my invention is to provide a toaster having a normally open heater control switch closable by a spring-biased lever arm operative to raise the bread carrier from toasting to toast-removing position at the end of a toasting operation.

Another object of my invention is to provide a toaster having means to permit of raising the carrier during a toasting operation to permit of visual inspection of the progress of the toasting operation without affecting a timer embodied in the toaster structure.

Still another object of my invention is to provide a toaster having means to prevent retoasting of a toasted slice of bread after the carrier supporting it has been moved into toast-removing position.

Other objects of my invention will either be apparent from a description of several forms of toasters embodying my invention or will be specifically pointed out in the course of such description and set forth in the appended claims.

In the drawings,

Figure 1 is a front elevational view, with certain parts shown in section, of the mechanism of a toaster embodying my invention showing parts in normal inoperative position, Fig. 2 is a view similar to Fig. 1 except that the spring tensioning the ejecting carriage has been moved first to its lowermost position, as shown by the broken lines, and then released to rise to its latching position, as shown in full lines, Fig. 3 is a view similar to Figs. 1 and 2 showing the position of the parts at the end of a toasting period, certain of the parts being shown in their toast-removing positions, Fig. 4 is a vertical side view of the parts shown in Fig. 3, Fig. 5 is a front view of the bread carrier carriage with the ejecting carriage and its associated parts taken on the line 5—5 of Fig. 4, the bread carrier being shown in the same position as that of Fig. 3, in the toast-removing position, but with the toasted slices of bread still in the toasting chamber, Fig. 6 is a front fragmentary vertical view the same as Fig. 5 but with the parts shown in the positions assumed by them immediately after the removal of slices of toast from both toasting chambers, Fig. 7 is a view similar to Figs. 5 and 6 but showing the bread carrier carriage in lowermost position immediately after removal of both slices of bread and after the parts have taken the positions shown in Fig. 6 of the drawings, Fig. 8 is a longitudinal vertical section on the line 8—8 of Fig. 1, the parts being shown in nontoasting positions, Fig. 9 is a fragmentary longitudinal vertical sectional view on the line 9—9 of Fig. 3 to show the two carriages biased to their uppermost positions by the lever arm immediately after the end of a toasting operation but with the slices of toast still on the carrier in the toasting chambers, Fig. 10 is a view similar to Fig. 9 but showing the position of the parts when the two carriages have been manually raised to upper position for toast inspection, and, Fig. 11 is a diagram of the electrical connections of my improved electric toaster.

I have elected to show my invention and the parts embodying it in a two-slice toaster designated generally by the numeral 21 and this toaster structure may include a moulded skeleton frame 23 now constituting a part of an automatic electric toaster being manufactured and sold. A thin sheet metal bottom plate 25 is located on the top of the frame 23 and may be secured thereagainst in any suitable or desired manner. There is further provided an outer sheet metal casing for the toaster comprising side sheets 27 and a central piece 29 which latter may be of substantially inverted U-shape, it being understood that these pieces cooperate with each other to provide an outer casing and any means now well known in the art may be employed for holding the parts of the outer casing in proper operative positions.

A plurality of pairs of vertically-extending planar heating elements 31 are provided, each electric toast heating element including one or more sheets 33 of electric-insulating material such as mica, having wound thereon a strand 35 of suitable resistor material and any suitable or desired means for holding the lower edges of the sheet or sheets 33 in proper operative positions on the bottom plate 25 may be employed. The upper edges of these heating elements may be held in proper operative positions by a top frame plate 37 and, as will be noted from Figs. 1 to 3 inclusive, the intermediate casing member 29 as well as the top frame plate 37 are provided with bread slice inserting and toast-removing openings 39 and 41, all in a manner well known in the art. I prefer to provide two spaced planar heating elements for each slice of bread to be toasted and a toasting chamber may be considered to be defined by the pair of spaced toast-heating elements and by a front interemediate wall 43 and a rear intermediate wall 45, all in a manner well known in the art. A plurality of vertically extending guard or guide wires 47 may also be provided to prevent engagement of a slice of bread with the radiant toast heating elements during a toasting operation.

I provide a bread carrier 49 between each pair of spaced heating elements, these bread carriers being vertically movable relatively to the heating elements into an upper or toast removing position and into a lower toasting position, this latter position being shown in Fig. 8 of the drawings. These bread carriers each have a rear portion extending through a slot in the rear intermediate wall 45 and a front portion extending through a vertical slot in the front intermediate wall 43 to permit of the above described vertical movements in the operation of the toaster. The two bread carriers 49 have the extreme front end portions thereof rigidly secured to a carrier carriage plate 51 (see Figs. 5, 6 and 7) in order to effect simultaneous movement of the two carriers. This carrier carriage plate is provided with bushings 53 at the top and at the bottom edge thereof which are adapted to slide on a vertical standard 55 the lower end of which is interfitting with the bottom plate 25, the top end thereof being held by a bracket 57 secured to the front intermediate wall 43.

Means for causing manual actuation of the bread carrier carriage from its lower or toasting position into its upper toast removing position includes an ejecting carriage structure 59 including a front member 61 and a rear member 63 having a lost motion connection with each other as by the provision of a machine screw 65 fixedly connected with the rear member 63 and movable in a slot 67 in front member 61. The front member 61 is provided with a forwardly extending projection 69 adapted to extend through a slot in the front wall portion of casing member 29 to have an actuating knob 71 secured thereto to permit of raising the ejecting carriage manually if desired for inspection of the progress of a toasting operation.

The rear portion 63 is adapted to move upwardly and downwardly on a pair of vertical standards 73 having their lower ends secured to the bottom plate 25 and having their upper ends held by bracket 57.

Means for causing upward movement of the bread carriers at the end of a toasting operation includes a lever arm 75 pivotally mounted on a shouldered stud 76 secured to a bracket member 77. This bracket member may be a laterally projecting part of horizontally and rearwardly extending bar 79, the front end portion of bar 79 being secured to the front intermediate wall 43 and the rear end portion of the bar 79 being rigidly secured to the rear intermediate wall 45. A biasing coil spring 81 has its lower end connected to a lever arm 82 on the stud 76 to turn with arm 75 and has its upper end connected to a projection 83 constituting a part of a bracket 85 which latter is secured to the front intermediate wall 43, which bracket also supports an air cylinder 87 having a piston movable therein and connected by a link 89 with the lever arm 82 to provide a means for reducing the shock of action of spring 81 on lever arm 75 when the latter is released at the end of a toasting operation, as will be hereinafter set forth. The lever arm 75 is adapted to engage a grooved roller 91 secured to member 63 of the ejecting carriage so that when released, as will be hereinafter described, lever arm 75 will act upon roller 91 to cause upward movement of the ejecting carriage and, by means to be hereinafter described, to cause upward movement of the bread carriers.

Means for controlling the energization of the toast heating elements 31 may include a pair of contact members 93 insulatedly supported on a bracket 95 which is in turn secured to and supported by the front intermediate wall 43. A contact bridging member 97 is adapted to engage with and be disengaged from the fixed contact members 93 and is insulatedly supported on a flexible bar 99 which is in turn carried by an arm 101 secured to the upper end of a vertically movable rod 103. This rod 103 is movable in a tubular member 105 having its lower end secured to the bottom plate 25, as shown more particularly in Fig. 8 of the drawings. Rod 103 is normally biased into a downward limiting position by a coil spring 107 within the tube 105. The lower end of rod 103 has depending therefrom a detent lever arm member 109 pivotally secured thereto, which detent member is normally yieldingly biased in a counter-clockwise direction by a small leaf spring 111, all as shown in Fig. 8 of the drawings. Detent member 109 is extended through an opening in bottom plate 25 and since it is pivotally mounted on the lower end of rod 103, it may be moved into releasing position by a lever arm 113 of L-shape, pivotally mounted on a pivot pin 115, a laterally-projecting detent-actuating pin 117 being provided on member 113 so that when a knob 119 is pressed downwardly by an operator, the detent arm 109 will be moved in a clockwise direction. Pivot pin 115 may be supported by a bracket 120 secured to bottom plate 25. Detent bar 109 is provided with a shoulder or hook 121 extending through a slot 122 in tube 105 outwardly thereof and adapted to engage with lever arm 75 when the same is moved downwardly to its extreme lower position as shown by the broken lines in Fig. 2 of the drawings. A guide 123 in the shape of a small band or plate is adapted to guide lever arm 75 into its proper position relatively to the shoulder 121 during its downward movement.

Normally, as was hereinbefore stated, contact bridging member 97 is held out of engagement with contact members 93 of the heater control switch by the action of coil spring 107 but when lever arm 75 has been moved to its extreme lowermost position and the operator then removes the pressure from knob 71, spring 81 causes upward movement of the free end of lever arm 75 so that contact bridging member 97 will be moved into engagement with the fixed contact members 93 to initiate a toasting operation. The upward movement of arm 75 and of rod 103 is limited by a projection 125 on the lower end of rod 103 engaging the wall at the upper end of slot 122. It may be noted that the toast heating element control switch is not moved from its normally open to its closed or engaged position to initiate a toasting operation by the action of an operator but that it is moved into closed position by the action of a biased lever arm 75 when the operator removes his pressure on the ejecting carriage-actuating knob 71.

Each of the bread carriers has pivotally mounted thereon a detector bar 127 which may in general be of substantially U-shape, the front end portion of which extends through a bearing 129 carried by the carrier carriage plate 51. Each front end portion of the detector bar has rigidly secured thereto a lever arm 131 the upper or movable end of which is provided with a roller 133 which roller is adapted to engage a substantially-vertically extending cam surface 135 of arcuate shape, secured to and spaced from front intermediate wall 43. The right-hand cam 135 has a lateral projection 136 matching the bracket 77 and coextensive therewith. The left-hand cam surfaces may constitute a part of the hereinbefore described bracket member 95, the general shape of these cam surfaces being shown in Figs. 5, 6 and 7 inclusive. Each detector bar has also rigidly secured thereto at its front end, in addition to the arm 131, a second lever arm 137, the relative position of this arm as regards arm 131 on detector bar 127 being shown, for instance, in Fig. 6 of the drawings. Each arm 137 has a short pin 139 mounted thereon at its free end which pin is adapted to engage a cam surface 141 on a pivotally mounted latch arm 143. A pair of such latch arms 143 is provided, each pivotally mounted on a front member 145 of the carrier carriage structure and a short coil spring 147 has its ends connected to the latches 143 to bias them towards each other, the approaching movement being limited by stop lugs 149 provided on plate 145. The front plate 145 is secured to and spaced from rear plate 51 by a plurality of bolts and spacers. A coil spring 151 has its upper end connected to a pin secured to member 51 and has its lower end connected to a small pin 153 mounted on arm 137 whereby detector bar 127 is biased into a given position and in a given direction when its position is not controlled by the cam surface 135. The detector bar 127 on the right-hand carrier, as seen in Figs. 5, 6 and 7, is biased into a clockwise direction while detector bar 127 on the left-hand carrier is biased into a counter-clockwise direction. It is, of course, evident that when the roller on arm 131 engages a cam surface 135, control of the position of the detector bar is effected by the cam surface itself. I have shown a pair of slices of bread 155, in Fig. 5 of the drawings, and it will be noted that, referring particularly to Fig. 5 of the drawings, when the bread carrier has been moved to its upper position at the end of a toasting operation, moved therein by means to be hereinafter described, the detector bar will be held in the position shown by the broken lines in Fig. 5 of the drawings by the slice of bread even though the roller on arm 131 is out of engagement with its cooperating cam surface.

The rear member 63 of the carrier-ejecting carriage structure is provided with a rearwardly-projecting detent member 157 which detent member is adapted to be engaged by the upper hook-shaped ends of latches 143, as will be noted say from Fig. 5 of the drawings, so that when permitted to do so by release of lever arm 75 from hook portion 121 of detent 109, and consequent upward movement of the end of lever arm 75, detent member 157 engaged with the latches 143 will cause upward movement of the bread carriers at the end of a toasting operation.

While I have shown a manually releasable means including arm 113 with knob 119 thereon, it is to be understood that I may provide any suitable timing means now well known in the art to effect release movement of detent arm 109 at the end of a toasting operation.

It is evident from Figs. 5 and 6 of the drawings that when a slice of toast is removed from the carrier when the carrier is in its upper position, as shown in Fig. 5 of the drawings, the detector bar 127 will be moved into a position to prevent the insertion of a slice of bread to be toasted, onto the carrier, the right-hand detector bar 127 moving into the position shown in broken lines in Fig. 6 of the drawings while the left-hand detector bar moves into the position shown also at the left side of Fig. 6. It will be further noted that pins 139 will have been moved into engagement with the angularly extending surface 141 of the latches 143 whereby these latches have been moved out of engagement with detent 157 and, in the case of a two-slice toaster, the removal of the second or the last slice of toast from the toasting chamber will cause immediate lowering of member 51, member 145 and of the parts secured thereto, mounted thereon and movable therewith into their lowermost positions as shown in Fig. 7 of the drawings, when the bread carriers will be in their lowermost or toasting position. It may be noted that a resilient member 159 of substantially closed U-shape is provided at the bottom end of vertical standard 55 to receive and cushion the shock of the parts closely associated with the carriers when they drop into their lower positions.

Reference may now be had to Figs. 9 and 10 of the drawings wherein I have shown a third latching means which is effective to prevent a second toasting of an already toasted slice of bread and which will permit of inspection of the progress of the toasting if desired by the operator.

Referring first of all to Fig. 9 of the drawings, I have there shown the positions of the carrier carriage and of the carrier-ejecting carriage which will be occupied by these parts when they have been moved into the positions shown at the end of a toasting operation by the action of the biased lever arm 75. It will be noted that the machine screw 65 secured to member 63 is in the upper end of slot 67 in member 61 so that the member 63 is in its uppermost position or limit of movement relative to member 61 and it will be noted also that detent 157 is in its uppermost position as well as are the parts of the carrier carriage and particularly member 51 thereof. I provide a latch member 161 pivotally mounted by a depending portion 163 constituting a part of bracket 57. Latch 161 is normally biased in a clockwise direction by a coil spring 165 and has a hook portion 167 at its front portion adapted to engage with a horizontally extending top part of member 61, as is shown in Fig. 9 of the drawings. Latch 161 is provided with a rear leaf spring finger 169, which is in turn engaged by the upper end of member 51, as shown in Fig. 9, whereby latch 161 is turned in a counter-clockwise direction against the bias of spring 165 so that hook portion 167 may engage under member 61, as shown in Fig. 9, to thereby hold the carrier and the slices of toast thereon in toast-removing position. As has hereinbefore been described, the removal of both slices of toast from a two-slice toast carrier causes dropping of the carrier and therefore of member 51 from the position shown in Fig. 9 to their lower positions where the carriers will be in toasting position. As soon as member 51 is moved out of engagement with spring finger 169, spring 165 will cause turning movement of latch 161 out of engagement with the upper end portion of member 61 so that the operator may initiate an immediately succeeding toasting operation, if desired, after dropping slices of bread onto the carriers.

Referring now to Fig. 10, I have there illustrated the parts in the position they will occupy if the operator raises the carriage for momentary inspection during a toasting operation. In this case machine screw 65 will be in the lower part of slot 67 in member 61 with the result that the carrier has been moved upwardly by the hereinbefore described cooperative action of detent 157 and the latch fingers 143, but member 51 of the carrier carriage structure will be in a somewhat different position than it would occupy if upward movement was effected by lever arm 75, with the result that member 51 will not engage spring finger 169 and with the attendant result that latch 161 will occupy the position shown in Fig. 10 of the drawings so that as soon as the operator removes his finger from the actuating knob 71, the carrier-ejecting carriage structure as well as the carrier carriage structure will drop to their lowermost positions from which they will be moved upwardly at the end of a toasting operation.

The contact members 93 may be connected by conductors 171 with intermediate terminal members 173 which are, in turn, electrically connected with the resistor wire of the toast heating elements and of the main terminal members 175.

The device embodying my invention thus provides a heater control switch normally biased to open position and adapted to be moved to closed position by carrier raising or carrier ejecting means including particularly a spring biased lever arm. My invention provides further means for returning detector bars on the carriers to proper toast receiving positions as soon as the carriers are moved to their lower or toasting positions, which movement is effected as soon as both slices of bread have been removed from the carriers in a two-slice toaster.

The device embodying my invention further provides means for preventing a second toasting of a toasted slice or slices of bread but permits of inspecting the progress of the toasting operation if desired by an operator.

Various modifications may be made in the structures embodying my invention without departing from the spirit and scope thereof and all such further modifications covered by the appended claims are to be considered as being part of my invention.

I claim as my invention:

1. An automatic electric toaster comprising toast heating elements, a bread carrier vertically movable into toasting and non-toasting positions relatively to the toast heating elements and normally biased into toasting position, a spring-biased lever arm, a carriage having a latch thereon movable vertically relatively to said toast heating elements and having means thereon adapted to engage said lever arm to move the lever arm downwardly, a detent on said bread carrier adapted to be engaged by said latch when the carriage has been moved downwardly, a second detent to hold said lever arm in its lower position, means to release said second detent at the end of a toasting operation and means including a detector bar pivotally mounted on said carrier controlled by a slice of bread on the carrier to cause engagement of the latch on the carriage with the detent on the carrier when a slice of bread is on the carrier, the lever arm being adapted to move the carriage and the carrier upwardly when released from said second detent and the detent on the carrier being released from the latch on the carriage by the removal of the slice of bread from the carrier to cause the carrier to move into toasting position.

2. An automatic electric toaster comprising toast heating elements, a control switch for said heating elements, a bread carrier vertically movable relatively to said heating elements into toasting and non-toasting positions and normally biased into toasting position, a vertically movable carriage, a lever arm engaging said carriage and normally yieldingly biased into a position to hold said carriage in its upper position, a detent operatively connected to said switch, spring means for normally holding said control switch in open position and means for moving said carriage and said lever arm downwardly and for moving said lever arm into engagement with said detent to cause closing of said control switch by said biased lever arm to start a toasting operation.

3. An automatic toaster comprising electric toast heating elements, a carriage vertically movable relatively to said heating elements into upper and lower limiting positions, a bread carrier vertically movable relatively to said heating elements into an upper toast-removing and a lower toasting position and normally biased to its lower toasting position, means for simultaneously raising the carriage and the carrier including a spring biased lever arm operatively engaging said carriage, a latch on said carriage and a detent on said carrier and means including a detector bar pivotally mounted on said carrier to cause operative interengagement of said latch and said detent and holding of said carrier in toast-removing position when said carriage has been moved into its upper position by said lever arm as long as a slice of bread rests on the carrier and to cause disengagement of the detent from the latch and consequent movement of said carrier to its lower position on removal of the slice of bread.

4. An automatic toaster comprising electric toast heating elements, a carriage vertically movable relatively to said heating elements into upper and lower limiting positions, a bread carrier vertically movable relatively to said heating elements into an upper toast-removing and a lower toasting position and normally biased to its lower toasting position, means for simultaneously raising the carriage and the carrier including a spring biased lever arm operatively engaging said carriage, a latch on said carriage and a detent on said carrier, means including a detector bar pivotally mounted on said carrier to cause operative interengagement of said latch and said detent and holding of said carrier in toast-removing position when said carriage has been moved into its upper position by said lever arm as long as a slice of bread rests on the carrier and to cause disengagement of the detent from the latch and consequent movement of said carrier to its lower position on removal of the slice of bread and stationary means comprising a cam operatively engaging said detector bar during downward movement of the carrier to cause return of the detent to latch-engaging position.

5. An automatic toaster comprising electric toast heating elements, a bread carrier vertically movable relatively to said toast heating elements into a limiting upper toast-removing position and a lower toasting position, means including a manually-actuable vertically-movable carriage to raise the carrier to its upper position, spring-actuated means to raise the carriage and the carrier to their upper positions simultaneously and a detent normally out of carrier holding position adapted to hold the carriage and the carrier in their upper positions and means on the carrier for moving said detent into carrier-holding position when the carrier is moved upwardly by the spring-actuated means.

6. An automatic toaster comprising electric toast heating elements, a bread carrier vertically movable relatively to said heating elements into an upper toast-removing position and a lower toasting position and biased into toasting position, a spring-actuated lever arm for causing upward movement of said carrier into toast-removing position, a latch normally yieldingly biased out of position where it can operatively engage and hold the carrier in toast-removing position, means on the carrier adapted to engage the latch and move it into position to hold the carrier in toast-removing position and means on the carrier including a detector bar engaged by a slice of bread on the carrier to prevent release of said latch and return of said carrier to toasting position until removal of a slice of bread from the carrier.

7. An automatic two-slice toaster comprising two pairs of electric toast heating elements, two bread carriers vertically movable relatively to said heating elements into an upper toast-removing and a lower toasting position and normally biased into toasting position, a carriage movable vertically relatively to the heating elements and having a latch thereon, a pair of detents on said carriers adapted to engage said latch, a spring biased lever arm adapted to engage said carriage and move the same upwardly, a detector bar pivotally mounted on each bread carrier and normally biased into a position to prevent location of a slice of bread on a carrier, and to cause disengagement of a detent from said latch, said lever arm causing upward movement of said carriage and said bread carriers at the end of a toasting operation, removal of a slice of bread from a carrier causing disengagement of a detent from the latch, movement of the carriers to their lower toasting position being effected only upon removal of both slices of bread from the carriers.

FRANK W. SCHARF.